(12) United States Patent
Dunn et al.

(10) Patent No.: US 7,721,830 B2
(45) Date of Patent: May 25, 2010

(54) TRACTOR WITH AUTOMATIC STEERING ARRANGEMENT

(75) Inventors: James Thomas Dunn, Winnipeg (CA); Philip J. Otto, Winnipeg (CA); Geoffrey U. Snider, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 275 days.

(21) Appl. No.: 12/056,372

(22) Filed: Mar. 27, 2008

(65) Prior Publication Data

US 2009/0242219 A1 Oct. 1, 2009

(51) Int. Cl.
*B62D 11/02* (2006.01)
(52) U.S. Cl. .................. 180/6.48; 180/6.2; 180/307
(58) Field of Classification Search .......... 180/6.2, 180/6.48, 305, 307, 308, 335, 336
See application file for complete search history.

(56) References Cited

U.S. PATENT DOCUMENTS

| | | | | |
|---|---|---|---|---|
| 4,281,737 | A * | 8/1981 | Molzahn | 180/307 |
| 5,383,528 | A * | 1/1995 | Nicol | 180/6.2 |
| 6,336,051 | B1 | 1/2002 | Pangels | |
| 6,397,966 | B1 * | 6/2002 | Irikura et al. | 180/307 |
| 6,523,635 | B1 | 2/2003 | Johnston | |
| 6,539,303 | B2 | 3/2003 | McClure | |
| 6,629,577 | B1 * | 10/2003 | Abend et al. | 180/367 |
| 7,040,425 | B2 * | 5/2006 | Hammonds | 180/6.48 |
| 7,059,433 | B2 * | 6/2006 | Hasegawa et al. | 180/6.2 |
| 7,077,220 | B2 * | 7/2006 | Dunn et al. | 180/6.2 |
| 7,188,015 | B2 | 3/2007 | Lange | |
| 7,306,062 | B2 * | 12/2007 | Dunn | 180/6.48 |
| 2006/0201732 | A1 | 9/2006 | Dunn et al. | |
| 2007/0017712 | A1 | 1/2007 | Dunn | |
| 2009/0049833 | A1 * | 2/2009 | Sakakura et al. | 60/484 |

FOREIGN PATENT DOCUMENTS

| | | |
|---|---|---|
| CA | 2513614 | 4/2005 |
| CA | 2505458 | 7/2005 |
| WO | WO 2006/133546 | 12/2006 |

\* cited by examiner

*Primary Examiner*—Lesley Morris
*Assistant Examiner*—Marc A Scharich
(74) *Attorney, Agent, or Firm*—Adrian D. Battison; Ade & Company Inc.

(57) ABSTRACT

A tractor has hydraulically driven wheels at a cab end and castor wheels at an engine end. It can be driven cab forward in a working mode with a header on the forward end. It is rotated to engine forward in the transport position for more stable higher speed travel. The driven wheels are driven by hydraulic motors each having their own drive pump the output of which is controlled by a cam plate. There is provided an automatic steering system having a guidance controller arranged to receive GPS position information and feed back signals and to generate output for controlling a hydraulic control valve for controlling flow in hydraulic fluid for a double acting hydraulic control cylinder arranged to actuate pivotal movement of the steering link member independently of the steering shaft.

24 Claims, 11 Drawing Sheets

TRACTOR WITH AUTOMATIC STEERING ARRANGEMENT

This invention relates to an automatic steering system for a hydraulically driven tractor of the type, commonly but not necessarily used as a swather tractor, which is supported on a pair of hydraulically driven wheels and a pair of castor wheels and steered by a differential speed between the driven wheels.

BACKGROUND OF THE INVENTION

Hydrostatically steered vehicles have been available for many years and their application to windrowers has been significant. There has been a limit to the transport speed of these windrowers due to instability at high speed with the drive wheels ahead of the castor wheels (cab forward). Higher speeds on the road allow the user to cover large distances without the use of trailers and tow vehicles.

In co-pending application filed Apr. 28, 2005, Ser. No. 11/116,418 published as 2006/0201732 and Canadian application filed Apr. 27, 2005, Ser. No. 2,513,614 and assigned to the present assignee is shown a machine in which the machine travels in transport mode with the castor wheels leading the drive wheels (engine forward), and in this position the machine is much more stable and higher speeds are possible.

In co-pending application filed Jul. 25, 2005, Ser. No. 11/188,293 published as 2007/0017712 and Canadian application filed Jul. 21, 2005, Ser. No. 2,505,458 and assigned to the present assignee is shown a steering and speed control arrangement for the above machine.

To vary the speed of the machine, both pump displacements are changed simultaneously. To steer the machine, the displacement of each pump is varied relative to each other so that the flow to each wheel is different which causes the machine to turn.

U.S. Pat. No. 6,523,635 (Johnston) issued Feb. 25, 2003 and assigned to Deere discloses a steering and speed control arrangement for a hydraulically driven tractor which includes a quadrant shaped steering rack and a four bar linkage which transmits the pivotal motion of the steering rack to the pump controllers.

U.S. Pat. No. 6,336,051 (Pangels) issued Jan. 1, 2002 and assigned to Carnegie Mellon University U.S. Pat. No. 7,188,015 (Lange) issued Mar. 6, 2007 and assigned to Trimble and U.S. Pat. No. 6,539,303 (McClure) issued Mar. 25, 2003 disclose typical GPS controlled steering systems for providing an automatic output capable of steering a tractor. The disclosures of these patents provide suitable control systems which can be used in the present arrangement and the disclosures of these prior patents are incorporated herein by reference.

In PCT Published Application WO 2006/133546 of Accutrak Systems Limited published Dec. 21, 2006 is disclosed a control system for providing automatic steering of a hydraulically driven tractor where fluid supplied to the drive motors of the driven wheels is by-passed by a control valve to effect the steering action. This arrangement has been found to have a serious problem in that the arrangement loses control in a situation where there is no flow to the motors for example in a slight downhill situation so that the tractor can move uncontrolled to any location.

SUMMARY OF THE INVENTION

It is one object of the invention to provide an improved tractor of the above type and in particular an improved arrangement of the automatic steering control.

According to one aspect of the invention there is provided a tractor comprising:

a tractor frame;

an engine mounted on the tractor frame;

a cab mounted on the tractor frame;

a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure, with the first hydraulic pump arranged for driving the first hydraulic motor of the first driven wheel and the second hydraulic pump arranged for driving the second hydraulic motor of the second driven wheel;

the first hydraulic pump including a first cam plate movable to vary the displacement of the pump to vary the volume of fluid generated as the pump is driven and the second hydraulic pump including a second cam plate movable to vary the displacement of the pump to vary the volume of fluid generated as the pump is driven;

a manually operable steering control movable between left and right positions through a center position;

the manually operable steering control including a steering wheel and a steering shaft rotatable by the steering wheel;

a manually operable speed control movable between forward and reverse positions through a neutral position;

the manually operable speed control being arranged to control a rate of supply of hydraulic fluid from the first hydraulic pump to the first drive motor and from the second hydraulic pump to the second drive motor to control a common speed of rotation of the driven wheels and thus a speed of movement of the tractor;

the manually operable steering control being arranged to control a differential in rate of supply of hydraulic fluid from the first hydraulic pump to the first drive motor and from the second hydraulic pump to the second drive motor to control a relative speed of rotation of the driven wheels and thus a turning direction of the tractor;

a linkage including a first link for controlling the first cam plate and a second link for controlling the second cam plate;

the linkage including a speed control member operable by the manually operable speed control with the speed control member arranged, when actuated in an actuation direction, to move both the first and second links for moving the first and second cam plates;

the linkage including a steering link member pivotally mounted relative to the speed control member so as, when actuated, to pivot to respective sides so as to move the first and second links relative to the speed control member to effect differential movement of the first and second cam plates;

the steering link member being pivoted by input caused by rotation of the steering shaft;

and an automatic steering system for providing a steering action in response to position information so as to steer the tractor to required positions comprising:

a guidance controller arranged to receive the position information and to generate output signals for controlling the steering action;

a hydraulic control valve arrangement responsive to the signals from the guidance controller for controlling flow in hydraulic fluid for supply of the fluid to first and second supply ducts;

a double acting hydraulic control cylinder arrangement for receiving the hydraulic fluid from the first and second supply ducts and including a drive shaft of the cylinder arrangement which is driven in first and second directions in response to supply of fluid from the first and second ducts;

the drive shaft being arranged to actuate pivotal movement of the steering link member independently of the steering shaft.

Preferably the steering link member is connected to an arm actuated by the steering shaft for actuating the pivotal movement of the steering link member and wherein the drive shaft of the cylinder is connected to the arm.

In one suitable arrangement, the cylinder is connected to a fixed point on the tractor. In this case, the cylinder is preferably arranged such that the drive shaft extends in a direction generally at right angles to the direction of actuation of the speed control member. In this way the movement of the speed control relative to the cylinder has little effect on the steering action.

In another suitable arrangement, the cylinder is connected to a point movable with the speed control and is arranged to move the steering link member relative to the point.

Preferably the control system includes a position sensor for detecting a position of the drive shaft relative to the cylinder and there is provided a feedback signal from the position sensor to the guidance controller.

Preferably the hydraulic control valve arrangement includes a proportional flow valve arranged to cause a flow of fluid to the first and second ducts which flow is proportional to an amplitude value of the output signals from the guidance controller.

Preferably the hydraulic control valve arrangement includes a bypass valve to allow hydraulic fluid in the cylinder to by-pass the cylinder when the cylinder is driven by movement of the steering link member from the steering shaft caused by a manual over-ride of the steering.

Preferably the hydraulic control valve arrangement is arranged such that the bypass valve includes a movable valve member which is operated by detection by a component of the hydraulic control valve arrangement of manual override of the steering generated by forces applied to the steering wheel.

Preferably the component of the hydraulic control valve arrangement is arranged for detection of the manual override of the steering by detecting a temporary increase in pressure in the hydraulic fluid supplied to the cylinder caused by the forces from the manual override.

Preferably the component of the hydraulic control valve arrangement is arranged to provide an output arranged to effect shut off of the output signals from the guidance controller.

Preferably the hydraulic control valve arrangement includes a pressure reducing valve for reducing pressure in a fluid supply to the hydraulic control valve arrangement.

The invention also relates to the automatic steering system itself for providing the steering action in response to position information so as to steer a tractor to required positions.

BRIEF DESCRIPTION OF THE DRAWINGS

One embodiment of the invention will now be described in conjunction with the accompanying drawings in which:

The above FIGS. 1 to 7 are taken from the above published application of the present Assignees.

In the drawings like characters of reference indicate corresponding parts in the different figures.

DETAILED DESCRIPTION

Figure 1:
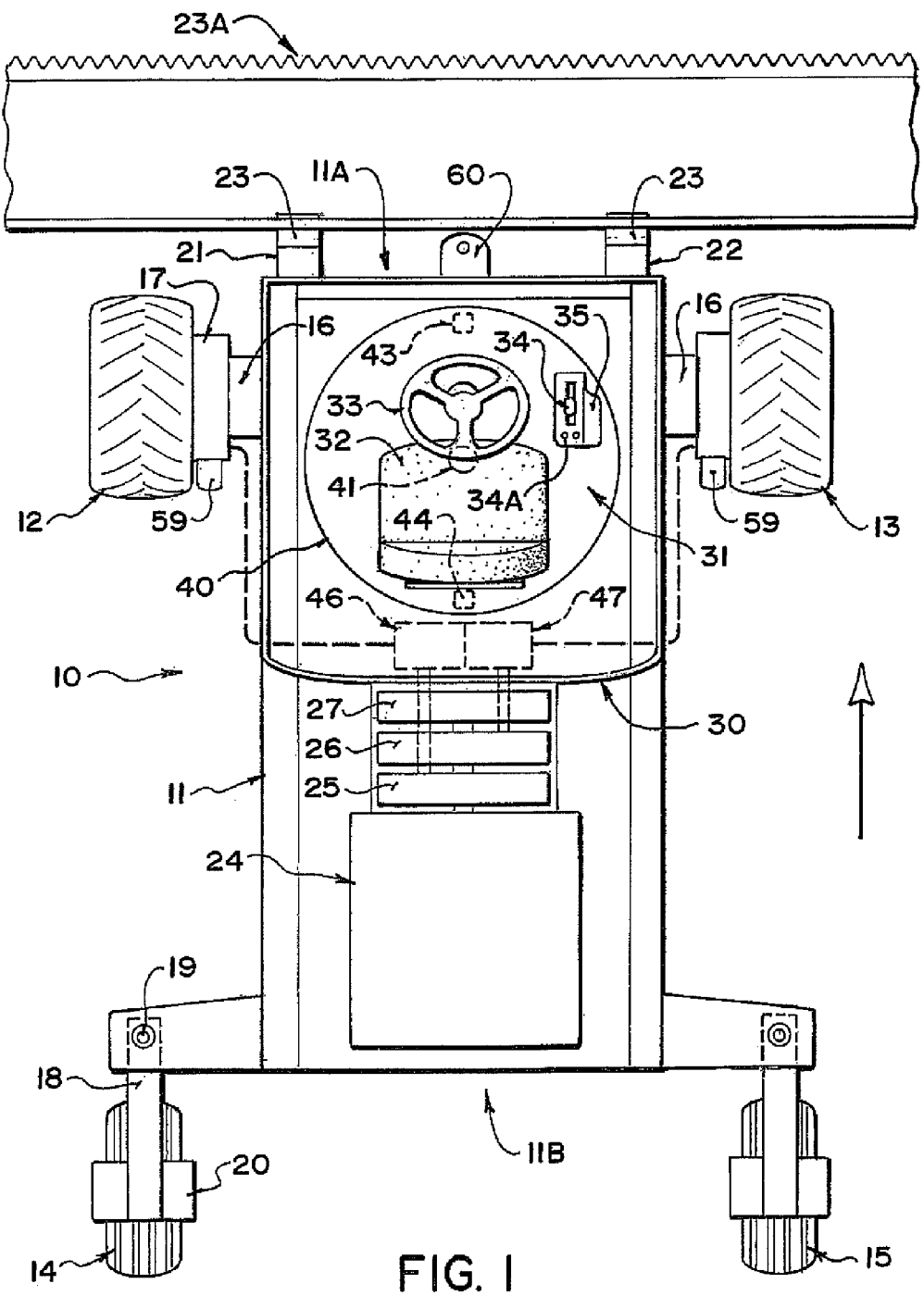
FIG. 1 is a top plan view partly in phantom and partly broken away showing a tractor of the type with which the present invention is concerned in the cab forward position.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. In addition there is provided a switch 34A which can be operated to select speed ranges for the driving speed of the vehicle.

To the right hand of the operator, on the same lever as the speed control for convenient access to the operator's hand, is provided the accessory control 35 which includes a series of switches and levers for operating the position and operating parameters of the header attached to the tractor. The switches include a header height and angle control by way of a four way (two axis) switch 35A, a reel height and forward location control by way of a four way (two axis) switch 35B and a reel speed control two way one axis switch 35C so that the skilled operator can control the parameters of the header during the working action. The header is engaged by a main drive control lever 35D in many cases also be reversed in the event of a blockage and thus will include a switch 35E for allowing such reversal.

Many of the above components are well known and conventional and can be found in many different designs of such tractors manufactured by a number of manufacturers including the present assignee. Further details of the reel speed control and reel location control are disclosed in the above co-pending application to which reference may be made filed simultaneously with this application.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIG. 2 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

The positioning of the platform in the two positions is detected by a pair of switches 43 and 44 which co-operate with an element 45 carried on the platform. Thus only when the platform and the seating console are properly located and fixed in one of the selected positions, is this position detected by the respective switch 43, 44 which is used in the control system as set forth hereinafter. The speed control 34 and the accessory control 35 and the display board 32A are fixed relative to the seat and the platform so that they rotate with the platform. Thus the operator, in both positions has the controls arranged exactly in the same position for operation in an exactly symmetrical manner. Thus the speed control works in the same manner in that rearward drives the vehicle toward the rear of the operator as the operator sees at the time and forward movement of the lever drives the lever forwardly in the orientation of the operator at the time. Mechanical and electrical coupling extend from the control systems including the steering, speed control and accessory control from the platform, through the support shaft 41 to a position underneath the frame where those communicating mechanical and electrical links cooperate with the relevant structures underneath the vehicle for controlling the movement of the vehicle. It will be appreciated that, when the operator is in the cab forward position shown in FIG. 1, movement of the speed control lever toward the end 11A moves the vehicle in the direction of the end 11A. When the seat is reversed, movement of the same lever in a direction away from the operator moves the lever toward the end 11B and must operate the tractor to move the vehicle along the direction toward the end 11B. This requires the linkage to be reversed since the effect of the lever must be reversed as the seat is rotated from one position to the other. This can be achieved by mechanical linkage or can be achieved by electrical and/or hydraulic connections as will be apparent to one skilled in the art.

Figure 2:
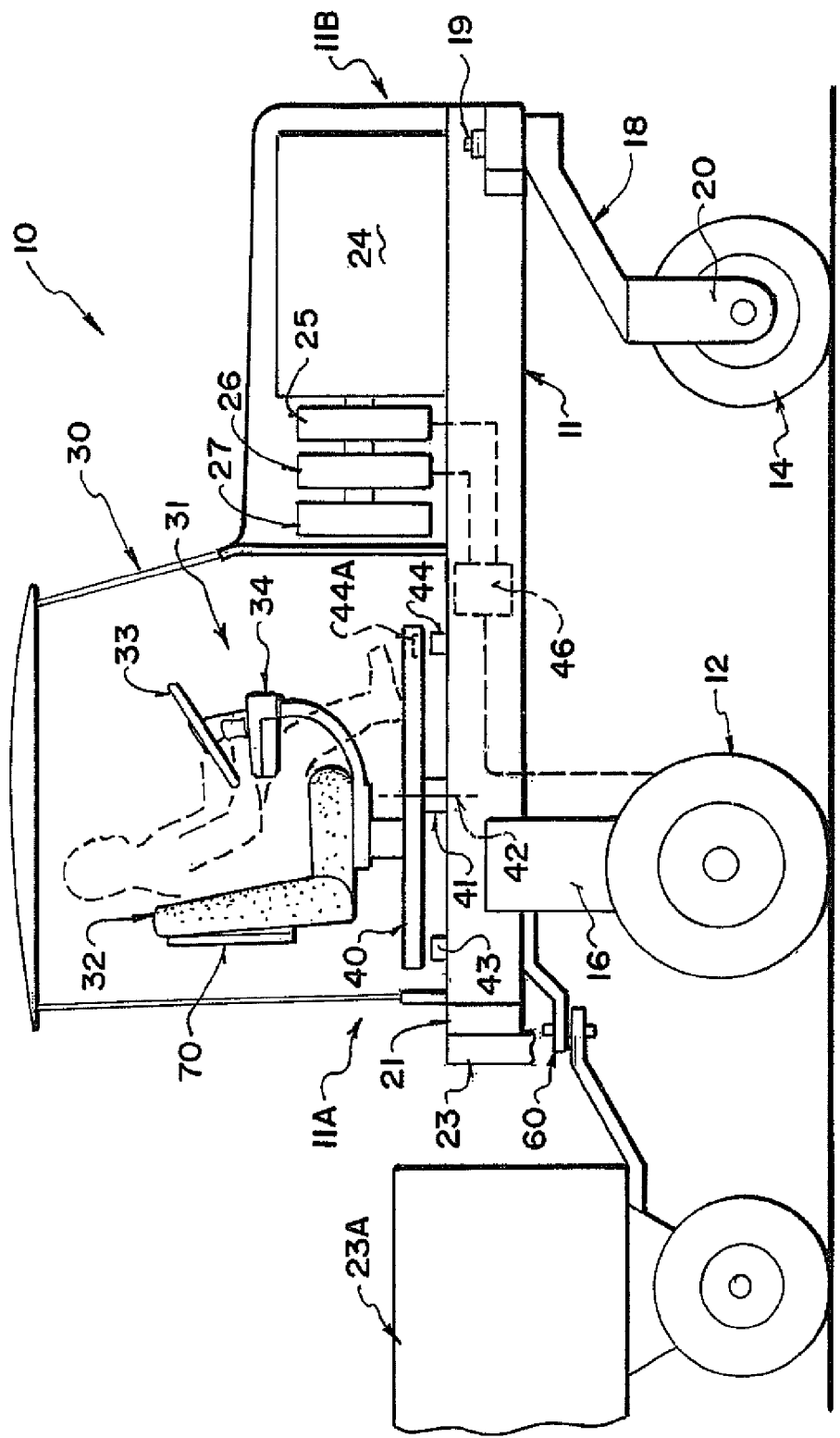
FIG. 2 is a side elevational view of the tractor of FIG. 1 in which the operator's seat and console have been rotated for operating the tractor in an engine forward position.
Figure 3:
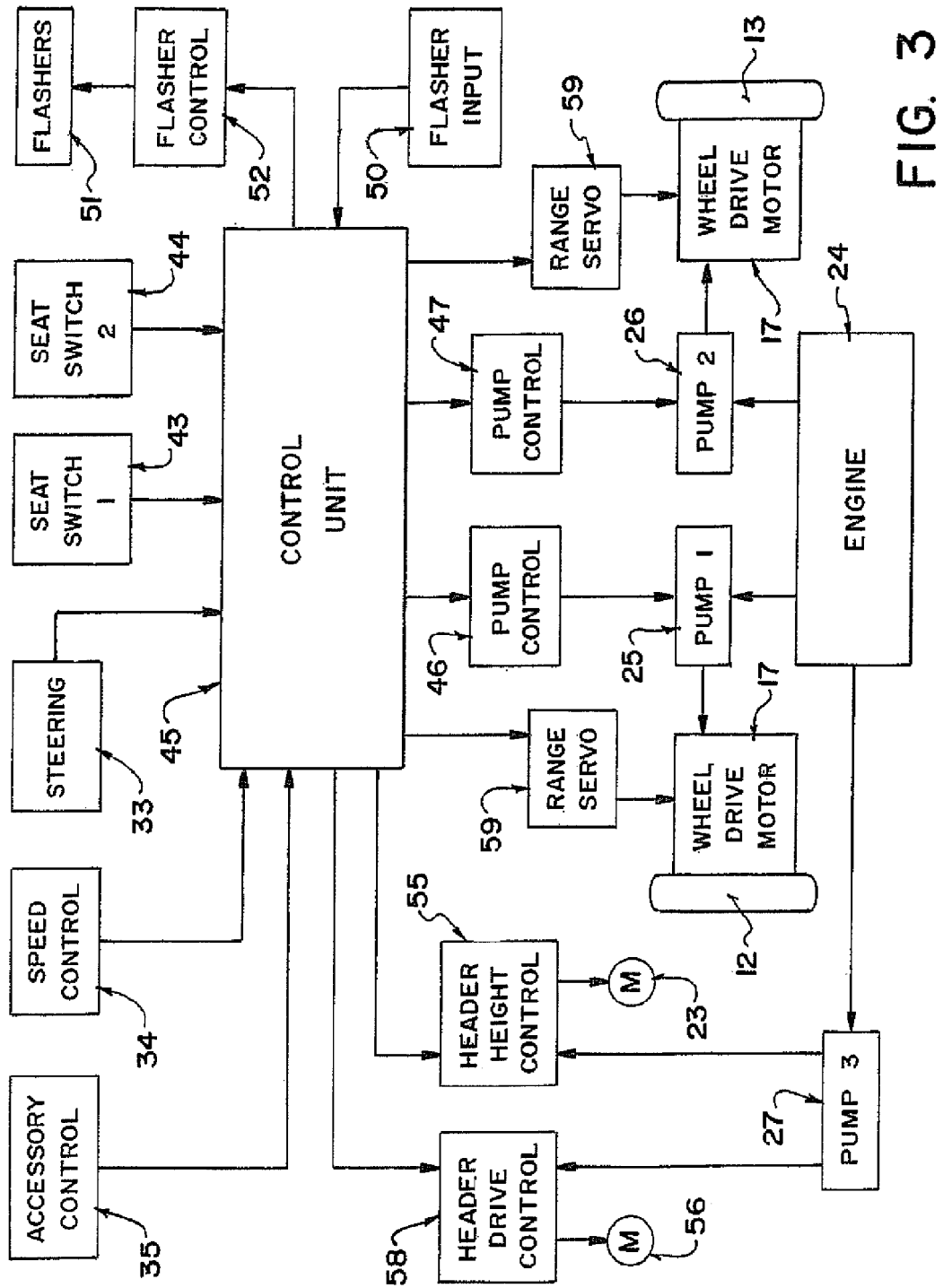
FIG. 3 is a schematic illustration of the control system for the tractor.
Figure 4:
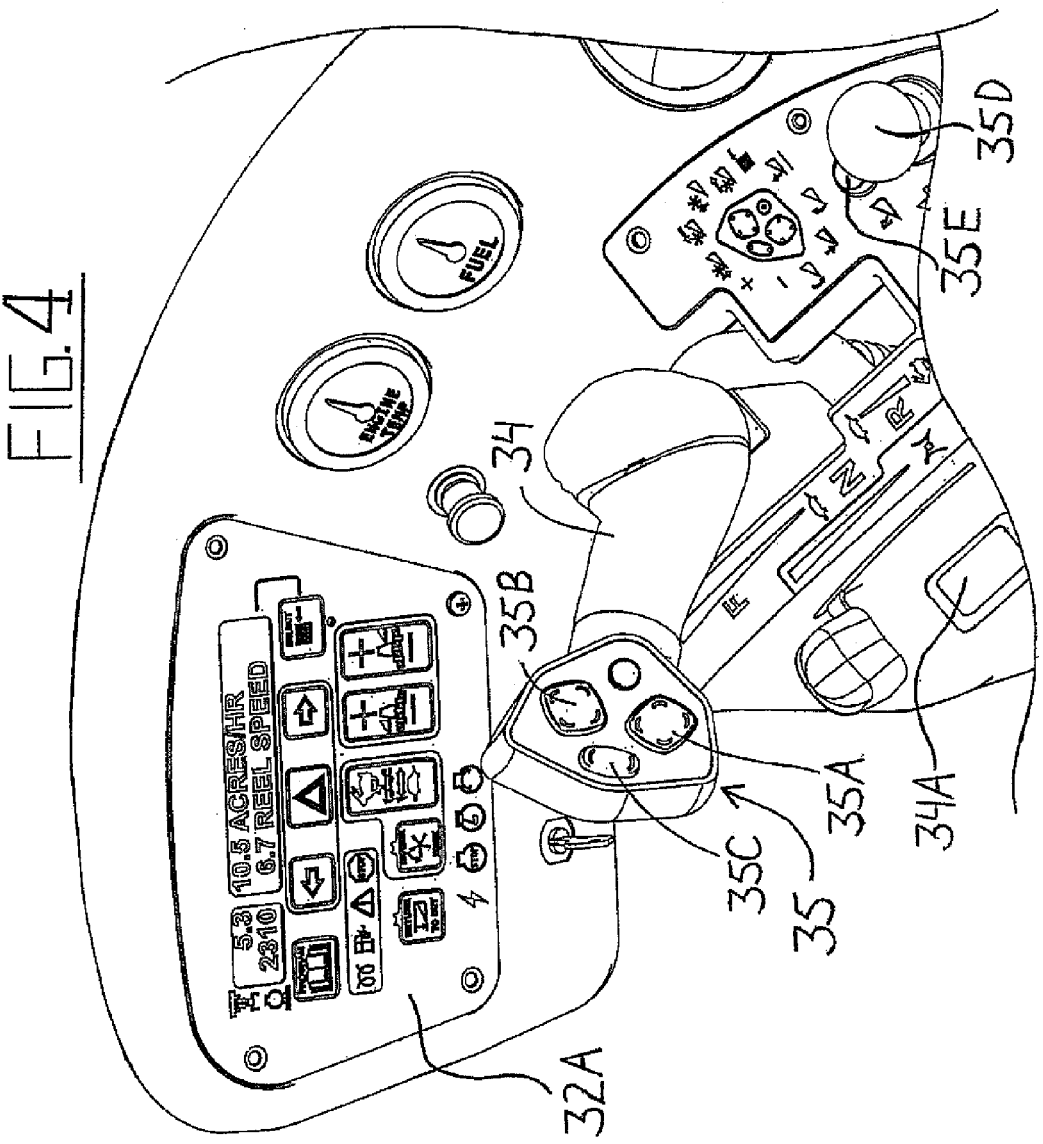
FIG. 4 is a top plan view of the control elements of the console of FIGS. 1, 2 and 3.

Turning now to the mechanical section as shown in FIG. 1 and the schematic control system as shown in FIG. 3, the speed control system 34 controls the pumps 25 and 26 through pump controls 46 and 47. The pump 25 supplies fluid to the drive motor 17 of the wheel 12. The pump 26 supplies fluid to the motor 17 of the wheel 13. The pumps are controlled to control the displacement of the pumps and therefore the amount of fluid generated in conventional manner. The rate of flow of fluid controls the rate of rotation of the respective motor so that the wheels rotate at a selected speed determine by the control of the pumps 25 and 26.

In addition the steering 33 controls the pumps 25 and 26 to generate a differential in the flow thereof so as to generate a differential in the speed of the motors 17. In the schematic illustration of a system shown in FIG. 3, this operation is shown as effected by a control unit 45 which is responsive to the signal from the steering and from the speed control and thus selects the positions of the pumps accordingly. However in the system described hereinafter, this is effected mechanically by providing two separate inputs to the pump control arrangement to provide a required speed and then a differential between the two pump controls.

As shown in FIG. 3 the control unit 45 is also responsive to input from the seat switch sensors 43 and 44 so that operation of many of the systems shown in FIG. 3 is only possible when the seat switch is actuated indicating that the platform is in a selected one of the two positions. In addition the indication from the respective seat switch of the selected position of the seat console is entered into the control unit to control the operation of the tractor in dependence of the cab forward or engine forward orientation.

In addition to the basic control of the movement of the vehicle, the control unit also provides outputs for controlling other elements of the tractor. In a first element the control console includes a conventional flasher input lever indicated at 50 by which the operator can operate turn signals or four way flashers as indicated by the flashing lights 51. The control unit is arranged so that the four flashers indicated at 51 can be operated simultaneously by the flasher control 52 in both positions of cab forward and engine forward described previously. However, as it is intended that primary mode of high speed transportation of the tractor is in the engine forward position, the turn signals are operated by the flasher control 52 so that the turn signals will only operate when the operator console and tractor are arranged in the engine forward position as detected by the respective seat switch.

The header drive system including the height control cylinders 23 actuated by a control system 55 is driven with fluid from the pump 27 also driven by the engine 24. The pump also supplies fluid to a motor 56 which drives the operation of the header. This drive can comprise a single motor driving all the components of the header including the cutting knife, the reel and any collection system including drapers and/or augers. However individual motors and individual controls can be provided.

The control unit 45 is arranged, in response to operation of the seat switch indicating that the operator console is in the cab forward position acts to allow actuation of the motor 56 through the drive control 58. When the seat is out of that position and particularly turned to the engine forward position, actuation of the header is prevented.

The height control 55 is arranged to provide adjustment of the height of cutting action and also to provide a raised position away from the cutting action. The control unit 45 is arranged to control the header/height control 55 so that the header is maintained in the raised inoperative position and cannot fall under automatic control to the cutting position when not in cab forward position.

The drive motors 17 also include adjustment by a servo unit 59 which selects different ranges for the motor. This is obtained by adjusting the cam plate of the motor to different displacement positions as is well known to one skilled in the art.

In one embodiment the drive motors 17 are arranged to have two different ranges that is a low speed range and a higher speed range. It is of course appreciated that the low speed range provides higher torque.

The control unit is arranged such that the high speed range can only be accessed when the operator console is in the engine forward position and thus cannot be accessed when the operator console is in the cab forward position. In this arrangement when the operator operates essentially one of the switches 35 to select one or other of the ranges, in the situation where the operator console is in the cab forward position, the system indicates to the operator that the high range cannot be accessed. In this way the intention is that the tractor can travel at significantly higher speeds in the engine forward position and is restricted to the lower speeds when in the cab forward position, bearing in mind that the tractor is unstable at the higher speeds when in the cab forward position.

In an alternative arrangement a three range motor can be provided with low, intermediate and high ranges accessible. In this arrangement the low and intermediate ranges are accessible in the cab forward position and the low and high ranges are accessible in the engine forward position. In the engine forward position the low ranges available for high torque and the high ranges are available for high speed. In the cab forward position the intermediate range is available for higher speed operation in the field.

Figure 5:
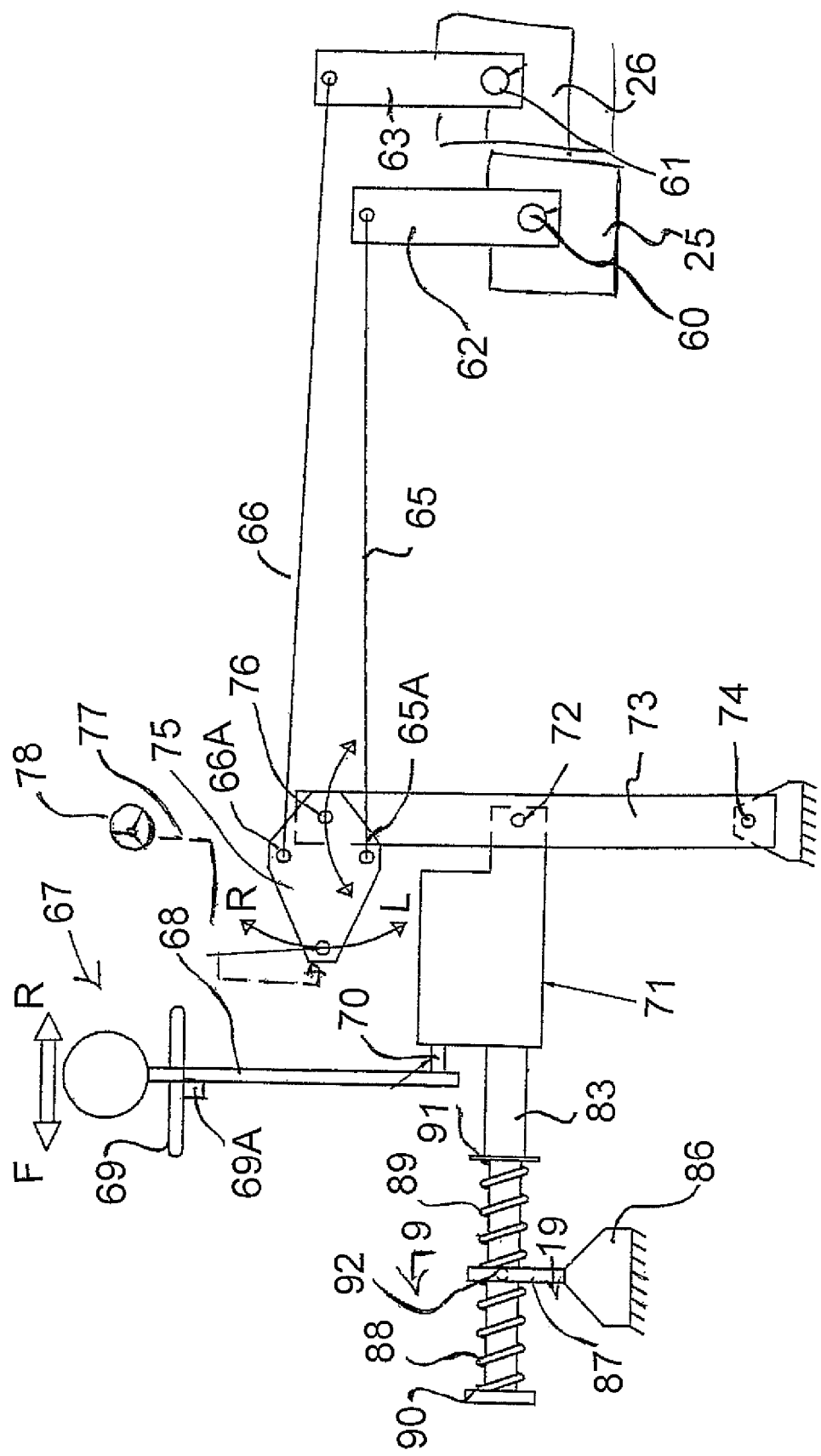
FIG. 5 is a schematic illustration of the linkage controlling the cam plates of the pumps providing hydraulic fluid for driving the driven wheels of the tractor of FIG. 1, showing the linkage in the neutral position of the speed control and the mid position of the steering control.

In FIG. 5 is shown schematically the linkage for actuating the movement of the cam plates of the two pumps for providing a selected volume of flow from each pump to the respective driven wheel.

Thus the first pump 25 and the second pump 26 are shown schematically in FIG. 5 and each includes a respective control shaft 60, 61 for the cam plate of the pump. Pumps of this type are of course well known and their construction is well known to one skilled in the art and such pumps are commercially available from many sources.

Figure 6:
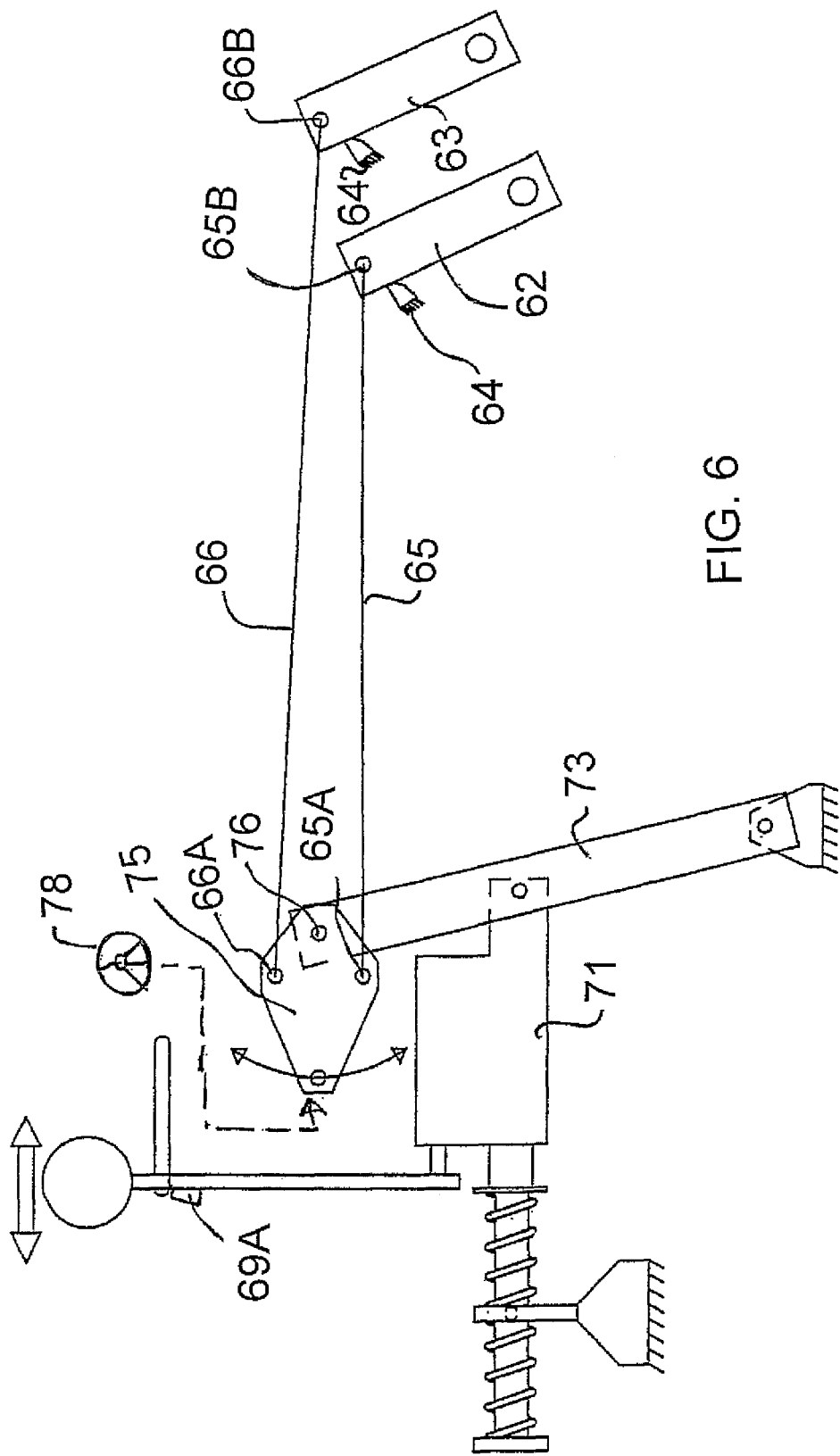
FIG. 6 is a schematic illustration of the linkage of FIG. 5, showing the linkage in the maximum forward speed position of the speed control and the mid position of the steering control.

Each of the shafts 60, 61 is controlled in its position by a respective actuation lever 62, 63. In FIG. 5 the levers are shown in a neutral position in which the cam plate has zero displacement so that no fluid flow is developed as the pump rotates. In FIG. 6, the levers have been moved to a maximum forward position against an end stop 64 so that each lever is moved from the vertical minimum position of FIG. 5 to an angled maximum position in FIG. 6. The end stop is shown schematically as a mechanical element separate from the lever and located on the pump but the end position of the movement can be determined by any suitable element either at the pump or at another location which limits the movement of the cam plate. Indeed the physical movement of the cam plate itself may act as the end stop without any necessity for an extra element contacting the lever. The movement of the levers is actuated by a pair of links 65 and 66 which are a fixed length and extend from a respective end 65A 66A at a control element of the linkage through to an end 65B, 66B at the respective lever. As the length of each link is fixed, movement of the ends 65A, 66A is transmitted to the lever in direct proportion.

The movement of the link 65 and 66 is controlled by two elements of the linkage shown in FIG. 5. Thus there is provided a manually operable speed control generally indicated at 67 which includes a manually operable lever 68 movable within a guide slot 69. The lever 68 is attached by a bar 70 to a servo cylinder 71. The servo cylinder 71 is connected by a pin 72 to a lever 73 the lever 73 forms a speed control member which is connected to both the ends 65A and 66A so that pivotal movement of the lever 73 about a mounting pin 74 in a common plane with the link 65 and 66 pushes the links commonly generally along their length so that the movement of the lever 73 is communicated to movement of the arms 62 and 63 of the pumps. The amount of movement of the lever is thus communicated to both arms 62 and 63 simultaneously and commonly at a proportion of the angle of movement which is dependant upon the geometry of the system. The geometry can of course be modified according to one skilled in the art and is shown only schematically.

Thus as illustrated, movement of the servo cylinder 71 to the left pulls the lever 73 which pulls the link 65 and 66 rotating the arm 62 and 63 to increase the angle of the cam plate from the neutral position through to the maximum position.

The control linkage also includes a steering member 75 which is carried on the lever 73 and which is connected to the ends 65A and 66A of the links. Thus the movement of the lever 73 is communicated to the link 65 and 66 through the structure of the steering member 75. The steering member 75 is mounted for pivotal movement about a pin 76 at the end of the lever 73 remote from the pin 74. When the steering member 75 remains fixed in a central position as shown in FIG. 5 about the pin 76, forward and rearward movement of the lever 73 actuated by the speed control 67 and the lever 70 is communicated to the link 65 and 66 as common movement without any differential.

Figure 7:
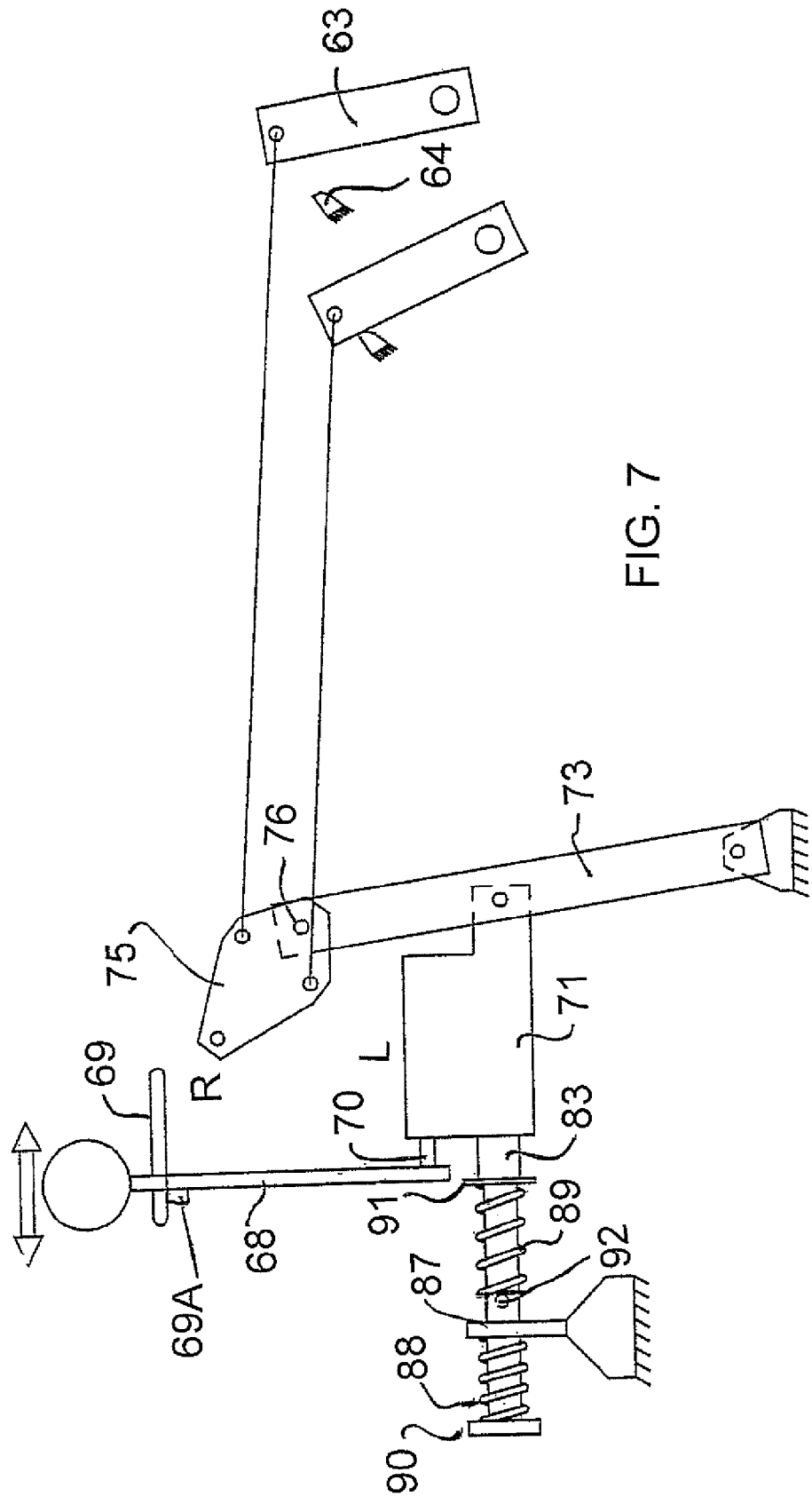
FIG. 7 is a schematic illustration of the linkage of FIG. 5, showing the linkage in the maximum forward speed position of the speed control and a turn position of the steering control.
Figure 8:
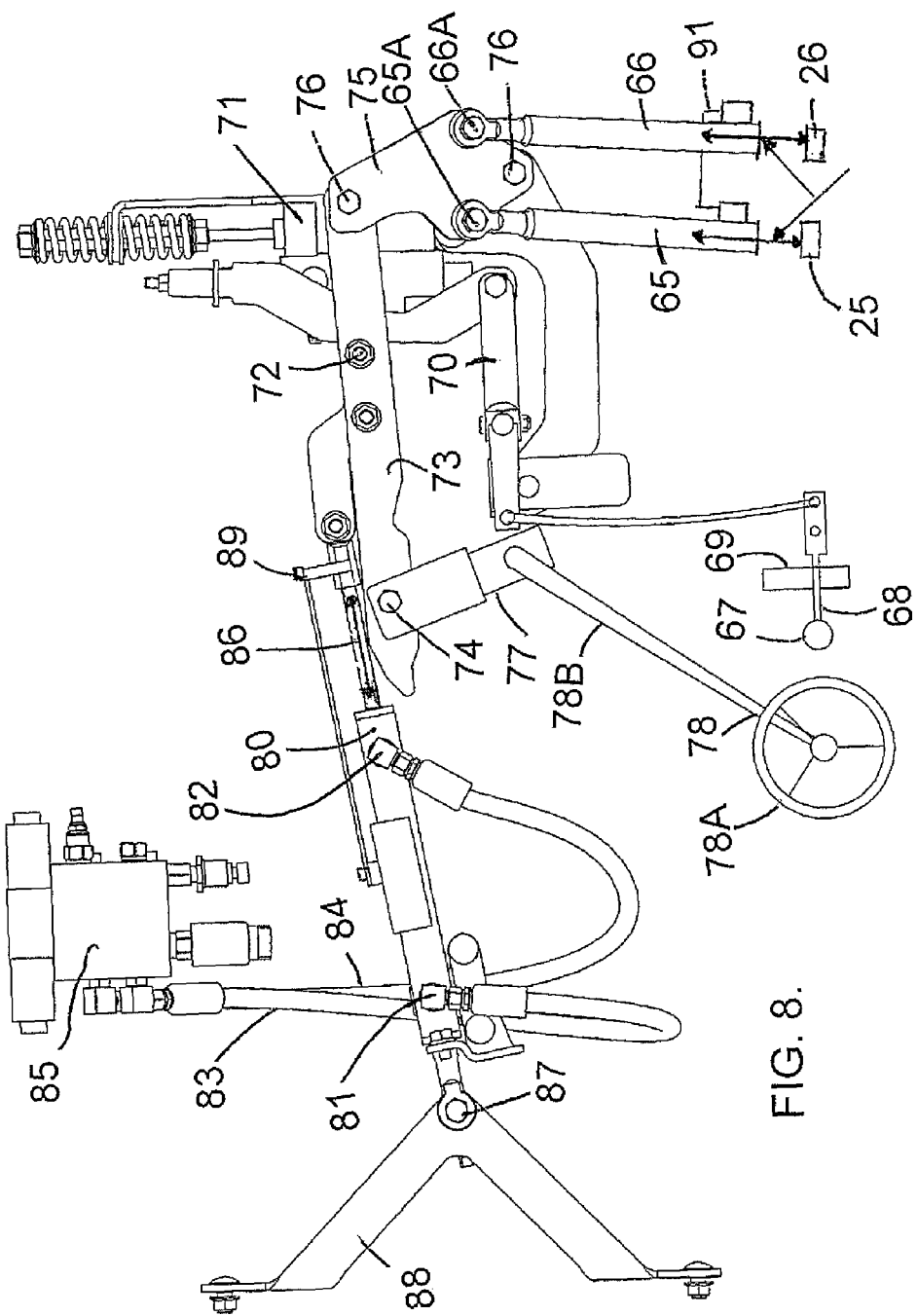
FIG. 8 is a plan view showing in more detail the steering system of FIG. 7 and including a steering control cylinder for actuating movement of the steering control link.

However differential movement between the link 65 and 66 can be provided by side to side pivotal movement of the steering member 75 about the pin 76. In this way as the lever 73 remains stationary the ends 65A and 66A can be moved relative to one another by the pivotal movement of the steering member 75 about the pin 76. The steering member 75 is actuated in its movement by a linkage 77 from the manually operable steering control 78 generally in the form of a steering wheel 78A and a steering shaft 78B. The linkage is shown only schematically from the steering wheel to the steering member 75 since this can be constructed in many different ways as well known to one skilled in the art. However it will be appreciated that turning of the steering wheel from right to left through a mid position will actuate pivotal movement of the steering member 75 from right to left as indicated about the pin 76. The steering movement can be effected while the lever 73 remains stationary or while the lever is moved since these movements are basically independent of one another. In FIGS. 5, 6 and 8 the steering member is shown in the central or straight ahead position whereas in FIG. 7 the steering member 75 is pivoted to one end as indicated at R so that the steering member 75 pivots about the pin 76 on the lever 73.

The above arrangement is shown and described in the above applications of the present Assignees, the disclosure of which is incorporated herein by reference.

Figure 9:
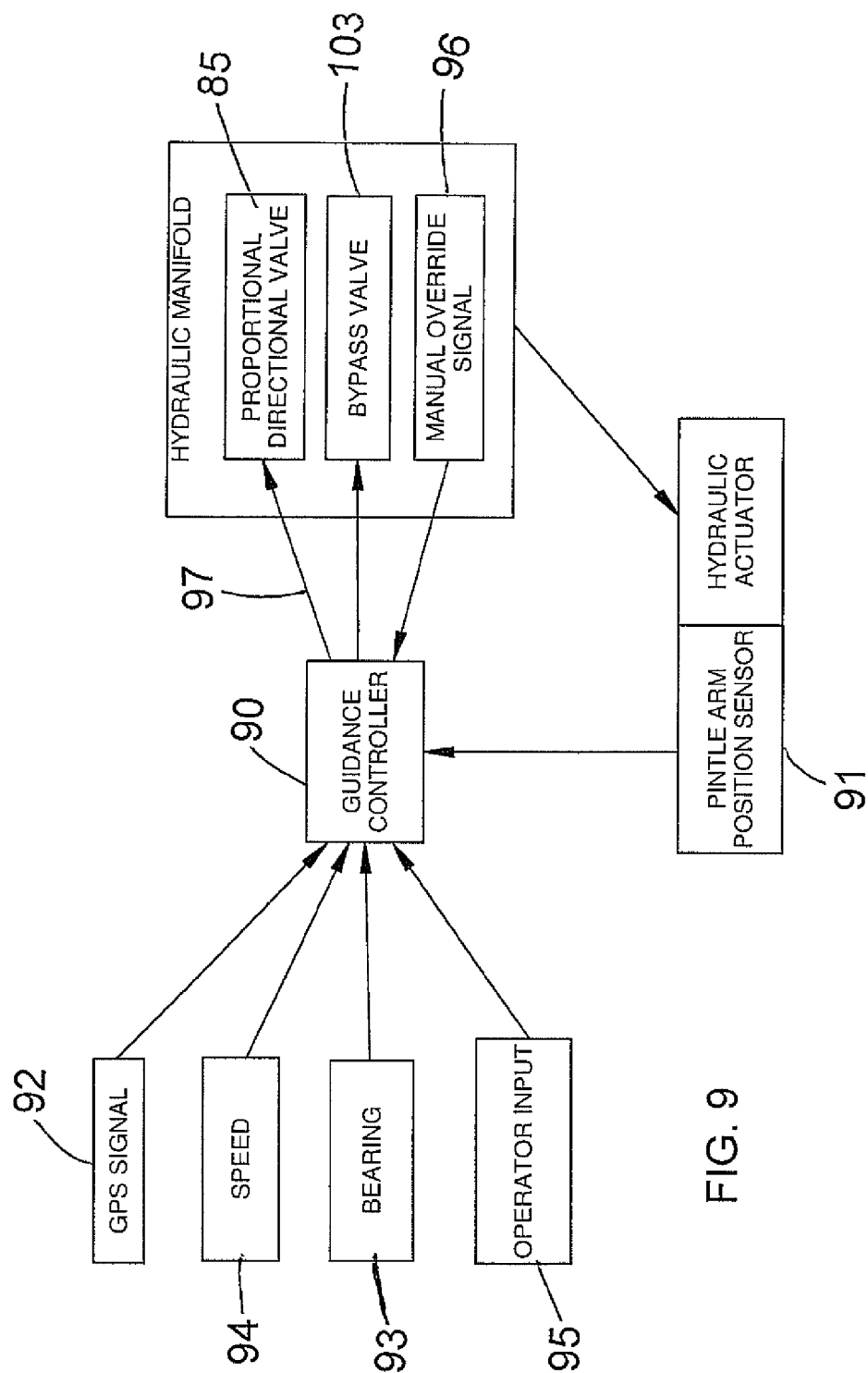
FIG. 9 is a schematic illustration of the control system using control principles disclosed in one or more of the above prior patents.
Figure 10:
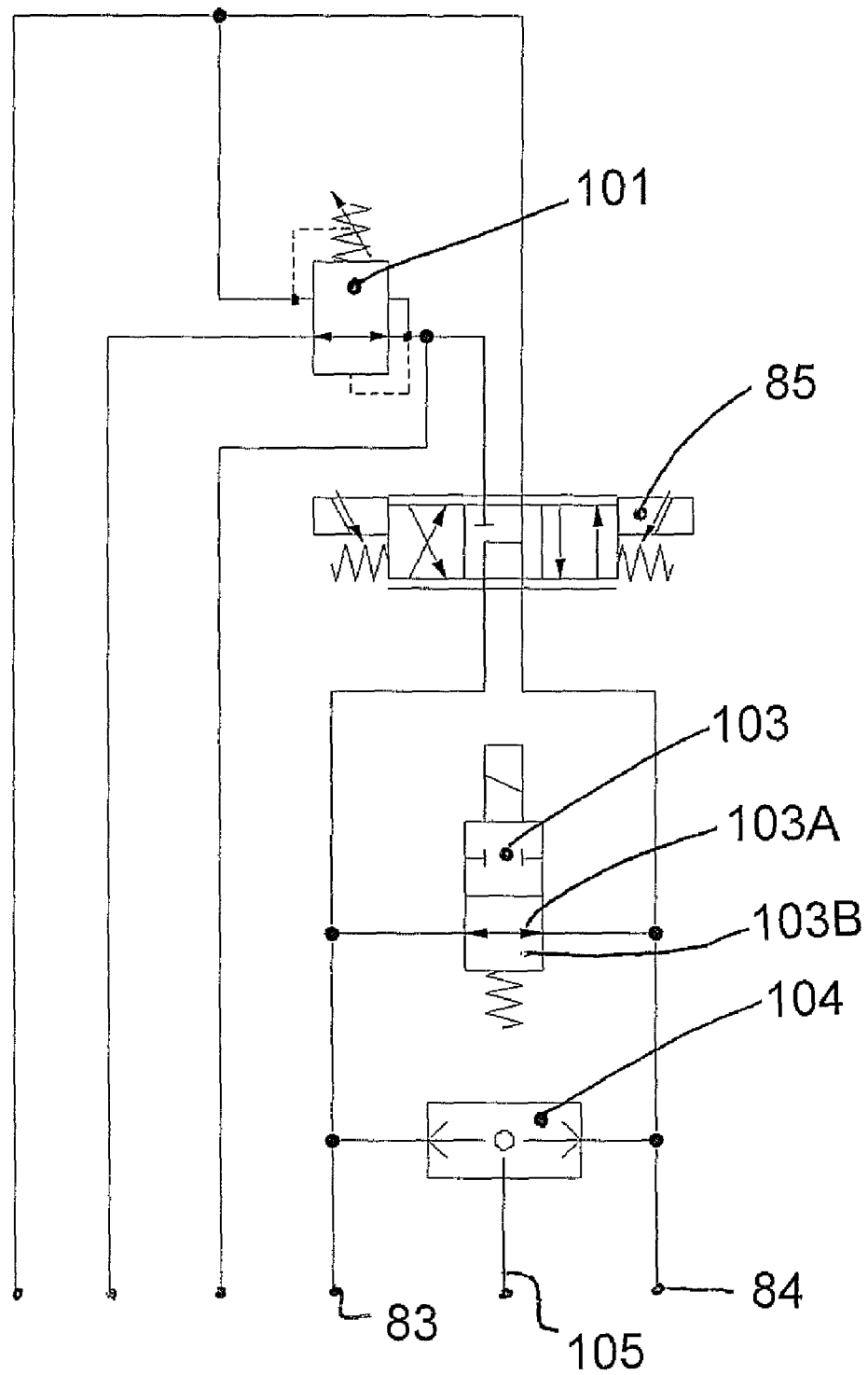
FIG. 10 is a schematic illustration of the hydraulic control circuit for supplying hydraulic fluid to the steering control cylinder of FIG. 8.

Turning now to the automatic steering system which is added to the above tractor steering system in accordance with the present invention as shown in FIGS. 8, 9 and 10, there is shown a double acting hydraulic control cylinder 80 with input ports 81 and 82 for receiving the hydraulic fluid from first and second supply ducts 83 and 84 from a control valve 85. The cylinder has a drive shaft 86 of the cylinder arrangement which is driven in first and second directions in response to supply of fluid from the first and second ducts with the drive shaft being arranged to actuate pivotal movement of the steering link member 75 independently of the steering shaft 78B.

The drive shaft 86 of the cylinder is connected to the arm 77 connected to the steering link member 75 and actuated by the steering shaft 78B for actuating the pivotal movement of the steering link member.

The cylinder 80 is connected to a fixed point 87 on the tractor defined by a bracket 88 which is shaped and designed relative to the steering system so as to connect to a part of the frame of the tractor. In order that the movement of the speed control system relative to the fixed point does not cause unintended steering action, the cylinder 80 is arranged such that the drive shaft extends in a direction generally at right angles to the direction of actuation of the speed control member.

There is also provided a sensor 91 to detect arm movement of the pintle arms 66 and 67 for detecting turning movement of the tractor for feedback to the guidance controller 90 (FIG. 9) of the automatic steering system.

Turning now to FIGS. 9 and 10, shows the schematic arrangement of the automatic steering system for providing a steering action in response to position information so as to steer the tractor to required positions.

The system comprises the guidance controller 90. This comprises a soft ware controlled device using various inputs and arranged to calculate the steering control outputs in dependence upon those inputs. Such devices are commercially available from a number of different suppliers and provide calculations using known algorithms to control the steering action. Typically such devices use an output system which controls the steering action through the manual control system such as the steering wheel or the shaft which provides drive from the steering wheel. The detailed algorithms of the controller 90 will not be described herein.

The controller receives input from the GPS position system 92, from a bearing system 93 which indicates the current bearing of the tractor, from a speed indicator responsive to the tractor speed and from an operator input which allows the system to receive control details from the operator.

The controller outputs an electrical control signal 97 to effect control of the steering system described above.

Turning now to the details of the hydraulic control valve arrangement 100 shown in FIG. 10, this includes a pressure reducing valve, the actual control valve 85 which receives the control signal and emits the pressurized fluid for controlling the cylinder, a bypass valve 103 and a shut off shuttle valve 104.

The valve 102 comprises a proportional flow valve arranged to cause a flow of fluid to the first and second ducts which flow is proportional to the amplitude value of the output signals 97 from the guidance controller 90. Such hydraulic valves are commercially available and hence detailed description is not required.

The bypass valve 103 is arranged to allow hydraulic fluid in the cylinder to by-pass the cylinder 80 when the cylinder 80 is driven by movement of the steering link member from the steering shaft caused by a manual over-ride of the steering. Thus the operator can over-ride the automatic steering system simply by applying force to the steering wheel since this activates the bypass and allows the back flow of fluid in the cylinder 80 to be bypassed through a line 193A and to flow to the required location regardless of the position of the valve 85. The hydraulic control valve arrangement is arranged such that the bypass valve includes a movable valve member 103B which is operated by the guidance controller 90 in response to detecting a temporary increase in pressure in the hydraulic fluid supplied to the cylinder caused by the forces from the manual override. Thus in general the bypass operates by of a component of the hydraulic control valve arrangement of manual override of the steering generated by forces applied to the steering wheel.

The hydraulic control valve arrangement also includes the valve 104 which is arranged to provide an output 105 to be supplied to the guidance controller 90 in response to detecting a temporary increase in pressure in the hydraulic fluid supplied to the cylinder caused by the forces from the manual override. The guidance controller 90 is programmed to effect shut off of the output signals from the guidance controller in response to this signal.

The following is an overview of the Hydraulic Valve Manifold Control Operation:

1. The charge pressure is reduced by the pressure reducing valve 101 to decrease potential load that could be induced at cylinder, this also decreases the rate the cylinder responds at a given valve activation. The cylinder is sized for flow requirements and not pressure.

2. During manual steering operations, the directional valve 85 is in neutral position and the bypass valve 103 is open to improve free flow of oil from cylinder and release pressure to tank.

3. During automated steering, the bypass valve 103 is closed and the directional valve 85 directs reduced pressure oil from to the lines 84 or 85 to control the cylinder extension or retraction.

4. Shuttle valve 105 monitors the highest pressure in both sides of the cylinder. When manual override is required, the operator turns the steering wheel which causes pressure to momentarily rise until the relief valve has time to respond and relieve the desired setting, this in turn sends off a signal via the port 105 of the shuttle valve 104 from a pressure transducer or switch to the guidance controller 90 to trigger the de-activation and cancel signals.

5. To achieve highly accurate positioning with variable speed displacement control, the system uses information from position sensor 91 to feedback to guidance controller 90.

Figure 11:
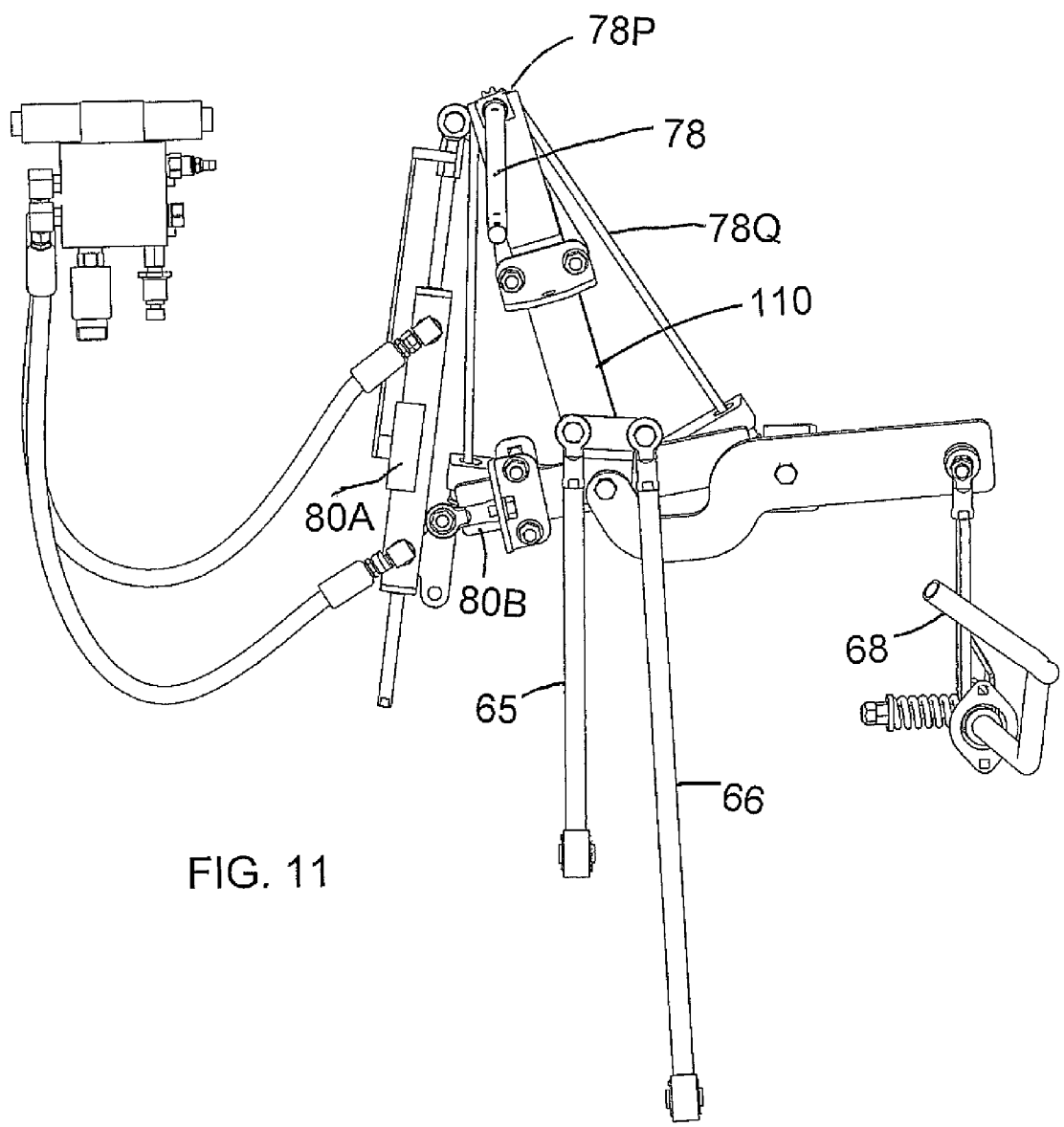
FIG. 11 is a plan view of an alternative arrangement of the steering system of FIG. 8.

Turning now to FIG. 11 there is shown a similar system where the components previously described are also used but where there is an alternative mounting of the cylinder 80A relative to the cylinder 80 of FIG. 8. The steering shaft 78 operates through a sprocket 78P running on a chain 78Q to pivot an arm 110 to the left and right which moves the lead ends of the pintle arms 65 and 66 side to side to effect a differential movement of the arms to effect the steering. In general, the key point of difference is that the cylinder 80A is mounted not on a fixed point but instead on a moving arm which moves with the speed control 68. Thus the cylinder 80A extends not at right angles to the movement as in FIG. 8 but instead extends longitudinal to the movement since its operation is between the moving point and the end of the lever 110. As the cylinder is mounted to one side of the lever 110 it acts to pivot the lever side to side in a common action to the sprocket and chain of the manual steering system.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A tractor comprising:
a tractor frame;
an engine mounted on the tractor frame;
a cab mounted on the tractor frame;
a first and a second driven wheels of the tractor mounted at a driven end of the tractor, the first driven wheel including a first hydraulic drive motor for driving the first wheel and the second driven wheel including a second hydraulic drive motor for driving the second wheel;
two non-driven castor wheels of the tractor mounted at a second end of the tractor;
the driven end having mounting assemblies for supporting a crop cutting header at a position in front of the driven end and in front of the cab when the driven end is forwards;
a first and a second hydraulic pump each driven by the engine for generating a source of hydraulic fluid under pressure, with the first hydraulic pump arranged for driving the first hydraulic motor of the first driven wheel and the second hydraulic pump arranged for driving the second hydraulic motor of the second driven wheel;
the first hydraulic pump including a first cam plate movable to vary the displacement of the pump to vary the volume of fluid generated as the pump is driven and the second hydraulic pump including a second cam plate movable to vary the displacement of the pump to vary the volume of fluid generated as the pump is driven;
a manually operable steering control movable between left and right positions through a center position;
the manually operable steering control including a steering wheel and a steering shaft rotatable by the steering wheel;
a manually operable speed control movable between forward and reverse positions through a neutral position;
the manually operable speed control being arranged to control a rate of supply of hydraulic fluid from the first hydraulic pump to the first drive motor and from the second hydraulic pump to the second drive motor to control a common speed of rotation of the driven wheels and thus a speed of movement of the tractor;
the manually operable steering control being arranged to control a differential in rate of supply of hydraulic fluid from the first hydraulic pump to the first drive motor and from the second hydraulic pump to the second drive motor to control a relative speed of rotation of the driven wheels and thus a turning direction of the tractor;
a linkage including a first link for controlling the first cam plate and a second link for controlling the second cam plate;
the linkage including a speed control member operable by the manually operable speed control with the speed control member arranged, when actuated in an actuation direction, to move both the first and second links for moving the first and second cam plates;
the linkage including a steering link member pivotally mounted relative to the speed control member so as, when actuated, to pivot to respective sides so as to move the first and second links relative to the speed control member to effect differential movement of the first and second cam plates;
the steering link member being pivoted by input caused by rotation of the steering shaft;
and an automatic steering system for providing a steering action in response to position information so as to steer the tractor to required positions comprising:
a guidance controller arranged to receive the position information and to generate output signals for controlling the steering action;
a hydraulic control valve arrangement responsive to the signals from the guidance controller for controlling flow in hydraulic fluid for supply of the fluid to first and second supply ducts;
a double acting hydraulic control cylinder arrangement for receiving the hydraulic fluid from the first and second supply ducts and including a drive shaft of the cylinder arrangement which is driven in first and second directions in response to supply of fluid from the first and second ducts;
the drive shaft being arranged to actuate pivotal movement of the steering link member independently of the steering shaft.

2. The tractor according to claim 1 wherein the steering link member is connected to an arm actuated by the steering shaft for actuating the pivotal movement of the steering link member and wherein the drive shaft of the cylinder is connected to the arm.

3. The tractor according to claim 1 wherein the cylinder is connected to a fixed point on the tractor.

4. The tractor according to claim 3 wherein the cylinder is arranged such that the drive shaft extends in a direction generally at right angles to the direction of actuation of the speed control member.

5. The tractor according to claim 1 wherein the cylinder is connected to a point movable with the speed control and is arranged to move the steering link member relative to the point.

6. The tractor according to claim 1 wherein the hydraulic control valve arrangement includes a proportional flow valve arranged to cause a flow of fluid to the first and second ducts which flow is proportional to an amplitude value of the output signals from the guidance controller.

7. The tractor according to claim 1 wherein the hydraulic control valve arrangement includes a bypass valve to allow hydraulic fluid in the cylinder to by-pass the cylinder when the cylinder is driven by movement of the steering link member from the steering shaft caused by a manual over-ride of the steering.

8. The tractor according to claim 7 wherein the hydraulic control valve arrangement is arranged such that the bypass valve includes a movable valve member which is operated by detection by a component of the hydraulic control valve arrangement of manual override of the steering generated by forces applied to the steering wheel.

9. The tractor according to claim 8 wherein the component of the hydraulic control valve arrangement is arranged for detection of the manual override of the steering by detecting a temporary increase in pressure in the hydraulic fluid supplied to the cylinder caused by the forces from the manual override.

10. The tractor according to claim 8 wherein the component of the hydraulic control valve arrangement is arranged to provide an output arranged to effect shut off of the output signals from the guidance controller.

11. The tractor according to claim 1 wherein the hydraulic control valve arrangement includes a component for detecting manual override of the steering and for providing an output arranged to effect shut off of the output signals from the guidance controller.

12. The tractor according to claim 11 wherein the component of the hydraulic control valve arrangement is arranged for detection of the manual override of the steering by detecting a temporary increase in pressure in the hydraulic fluid supplied to the cylinder caused by the forces from the manual override.

13. The tractor according to claim 1 wherein the hydraulic control valve arrangement includes a pressure reducing valve for reducing pressure in a fluid supply to the hydraulic control valve arrangement.

14. The tractor according to claim 1 wherein there is provided a sensor for detecting turning movement of the tractor for feedback to the hydraulic control valve arrangement.

15. An automatic steering system for providing a steering action in response to position information so as to steer a tractor to required positions where the tractor includes:
  a first and a second driven wheels of the tractor mounted at a driven end of the tractor, the first driven wheel including a first hydraulic drive motor for driving the first wheel and the second driven wheel including a second hydraulic drive motor for driving the second wheel;
  a first and a second hydraulic pump each driven by the engine for generating a source of hydraulic fluid under pressure, with the first hydraulic pump arranged for driving the first hydraulic motor of the first driven wheel and the second hydraulic pump arranged for driving the second hydraulic motor of the second driven wheel;
  the first hydraulic pump including a first cam plate movable to vary the displacement of the pump to vary the volume of fluid generated as the pump is driven and the second hydraulic pump including a second cam plate movable to vary the displacement of the pump to vary the volume of fluid generated as the pump is driven;
  a manually operable steering control movable between left and right positions through a center position;
  the manually operable steering control including a steering wheel and a steering shaft rotatable by the steering wheel;
  a manually operable speed control movable between forward and reverse positions through a neutral position;
  the manually operable speed control being arranged to control a rate of supply of hydraulic fluid from the first hydraulic pump to the first drive motor and from the second hydraulic pump to the second drive motor to control a common speed of rotation of the driven wheels and thus a speed of movement of the tractor;
  the manually operable steering control being arranged to control a differential in rate of supply of hydraulic fluid from the first hydraulic pump to the first drive motor and from the second hydraulic pump to the second drive motor to control a relative speed of rotation of the driven wheels and thus a turning direction of the tractor;
  a linkage including a first link for controlling the first cam plate and a second link for controlling the second cam plate;
  the linkage including a speed control member operable by the manually operable speed control with the speed control member arranged, when actuated in an actuation direction, to move both the first and second links for moving the first and second cam plates;
  the linkage including a steering link member pivotally mounted relative to the speed control member so as, when actuated, to pivot to respective sides so as to move the first and second links relative to the speed control member to effect differential movement of the first and second cam plates;
  the steering link member being pivoted by input caused by rotation of the steering shaft;
  the automatic steering system comprising:
    a guidance controller arranged to receive the position information and to generate output signals for controlling the steering action;
    a hydraulic control valve arrangement responsive to the signals from the guidance controller for controlling flow in hydraulic fluid for supply of the fluid to first and second supply ducts;
    a double acting hydraulic control cylinder arrangement for receiving the hydraulic fluid from the first and second supply ducts and including a drive shaft of the cylinder arrangement which is driven in first and second directions in response to supply of fluid from the first and second ducts;
    the drive shaft being arranged to actuate pivotal movement of the steering link member independently of the steering shaft.

16. The automatic steering system according to claim 15 wherein the hydraulic control valve arrangement includes a proportional flow valve arranged to cause a flow of fluid to the first and second ducts which flow is proportional to an amplitude value of the output signals from the guidance controller.

17. The automatic steering system according to claim 15 wherein the hydraulic control valve arrangement includes a bypass valve to allow hydraulic fluid in the cylinder to by-pass the cylinder when the cylinder is driven by movement of the steering link member from the steering shaft caused by a manual over-ride of the steering.

18. The automatic steering system according to claim 17 wherein the hydraulic control valve arrangement is arranged such that the bypass valve includes a movable valve member which is operated by detection by a component of the hydraulic control valve arrangement of manual override of the steering generated by forces applied to the steering wheel.

19. The automatic steering system according to claim 18 wherein the component of the hydraulic control valve arrangement is arranged for detection of the manual override of the steering by detecting a temporary increase in pressure in the hydraulic fluid supplied to the cylinder caused by the forces from the manual override.

20. The automatic steering system according to claim 19 wherein the component of the hydraulic control valve arrangement is arranged to provide an output arranged to effect shut off of the output signals from the guidance controller.

21. The automatic steering system according to claim 15 wherein the hydraulic control valve arrangement includes a component for detecting manual override of the steering and for providing an output arranged to effect shut off of the output signals from the guidance controller.

22. The automatic steering system according to claim 21 wherein the component of the hydraulic control valve arrangement is arranged for detection of the manual override of the steering by detecting a temporary increase in pressure in the hydraulic fluid supplied to the cylinder caused by the forces from the manual override.

23. The automatic steering system according to claim 15 wherein the hydraulic control valve arrangement includes a pressure reducing valve for reducing pressure in a fluid supply to the hydraulic control valve arrangement.

24. The automatic steering system according to claim 15 wherein there is provided a sensor for detecting turning movement of the tractor for feedback to the hydraulic control valve arrangement.

* * * * *